3,532,487
COMBATING WEEDS IN SOYBEANS
Roger P. Cahoy, Merriam, Kans., assignor to Gulf Research & Development Company, Pittsburgh, Pa., a corporation of Delaware
No Drawing. Filed Sept. 5, 1967, Ser. No. 665,260
Int. Cl. A01n 9/24, 13/00
U.S. Cl. 71—83     5 Claims

ABSTRACT OF THE DISCLOSURE

Hindered 2,6 - dialkyl-4-nitrophenols in which alkyl substituents in 2- and 6-positions, at least one of which is isopropyl, exert a total hindering effect which lies between the effect of 2,6-diethyl and 2,6-ditert. butyl are employed to combat weeds in soybeans; from about ½ to 5 lb. of 2,6-diisopropyl-4-nitrophenol per acre, applied to the locus of the weeds, effecting control of such species as pigweed, lambsquarter and cocklebur.

DESCRIPTION OF INVENTION

Hindered phenols, in which substituents in 2,4- and 6-positions reduce the characteristic phenolic reactivity of the hydroxy group have been known for over twenty years. See G. H. Stillson, D. W. Sawyer and C. K. Hunt, J. Am. Chem. Soc. v. 67, p. 303–307 (February 1945) and N. D. Coggeshall, J. Am. Chem. Soc., v, 69, p. 1620–1624 (July 1947). The hindering effect of the substituent groups has been observed to vary in degree. The high degree of hindering produced by tertiary butyl substituents in 2- and 6-positions has been found advantageous with respect to the utility of these componds as antioxidants. Methyl groups in 2- and 6-positions are not considered to exert a substantial hindering effect, whereas a combination of a methyl and a tertiary butyl substituent in 2- and 6-position hinders phenolic reactivity only partially.

There exists a long-standing problem of control of several broad-leaf species of weeds in soybeans. So far, chemical methods of control are only partially successful because soybeans are very easily injured by the phytotoxic compositions which are effective against the weeds.

A known phytotoxic substance is 4-nitrophenol. This compound, however, lacks selectivity and therefore has little utility as a herbicide. I have now discovered that a class of hindered 2,6-dialkyl-4-nitrophenols can be used to selectively combat such noxious weeds as pigweed, lambsquarter and cocklebur with little or no permanent injury to soybeans.

The degree of the hindrance of these 4-nitrophenols has been observed to affect critically the desirable selective toxicity of the compounds.

Below are described carefully controlled greenhouse tests which illustrate the differences in phytotoxicity of the compounds which are attributable to differences in 2,6-substituents. Both activity and selectivity were evaluated according to the following procedure:

(1) Post emergent activity

An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots were sprayed with an aqueous dispersion of the active compound prepared as described above, at a rate of 5 lb. of active-compound per acre and at a spray volume of 60 gallons per acre. Approximately one week after the spray application the plants were observed and the results rated according to the following schedule:

| Type of action: | Degree |
|---|---|
| C=Chlorosis (bleaching) | 0=no effect. |
| N=Necrosis | 1=slight effect. |
| G=Growth inhibition | 2=moderate effect. |
| F=Formative effect (abnormal form of growth | 3=severe effect. |
| K=Non-emergence | 4=maximum effect (all plants died). |

The same rating schedule was employed to judge pre-emergent results obtained according to the procedure below.

(2) Pre-emergent activity

A solution of each active compound was prepared by dissolving 290 mg. of the compound to be tested in 200 ml. of acetone. Disposable paper half-flats were prepared and seeded with a variety of species of plant seeds, then sprayed with the acetone solution at the rate of 10 lb. of active chemical per acre of sprayed area. One flat, which had been seeded with alfalfa, brome, flax, oats, radishes and sugar beets was held at 75° F. day temperature; another seeded with corn, coxcomb, cotton, crabgrass, millet and soybeans was held at 85° F. Twenty-one days after seeding and treatment the flats were examined and plant emergence and effects on growth were rated according to the above schedule.

Both the post-emergent and pre-emergent results are set forth in the following table.

| Compound | Type of activity | Crabgrass | Coxcomb | Brome grass | Millet | Soybeans | Cotton | Alfalfa | Oats | Corn | Flax | Radish | Sugar beets | Wheat | Grain sorghum |
|---|---|---|---|---|---|---|---|---|---|---|---|---|---|---|---|
| 2,6-dimethyl-4-nitrophenol | Post | | | | N3, G3 | N1 | N2, G2 | N4 | N2, G2 | G1 | N4 | N4 | N4 | N2, G1 | N1, G1 |
| | Pre | 0 | 0 | 0 | 0 | F1, G1 | 0 | K4 | 0 | 0 | 0 | 0 | 0 | | |
| 2,6-diisopropyl-4-nitrophenol | Post | | | | N4 | N3, G3 | N4 | N4 | N2, G1 | N3, G3 | N4 | N4 | N4 | N2, G1 | N1, G1 |
| | Pre | N4 | N4 | N3, G3 | N4 | K2, G2 | G1 | N3, G3 | G1 | 0 | G2 | G1 | N4 | N1, G1 | 0 |
| 2,6-di tert butyl-4-nitrophenol | Post | G3 | G1 | | G3 | N2 | N2, G2 | N3, G1 | N2, G1 | N2 | N1 | G2 | N4 | N1, G1 | |
| | Pre | | | | N1, G1 | N1 | | K2, G2 | N1, G1 | N1 | N2, G2 | N2, G2 | G3, N3 | | N1 |
| 2,6-diethyl-4-nitrophenol | Post | | | | | | | | | | | | | | |

---

3,532,487

The compounds employed in the tests discussed above are all of the easily prepared symmetrical 2,6-dialkyl type. Unsymmetrical 2,6-dialkyl-4-nitrophenols behave in a similar manner but are more expensive to prepare and would serve no better for purposes of illustration. It can be seen that the greatest pre-emergent activity lies between 2,6-dimethyl- and 2,6-ditert.butyl-and the greatest post-emergent activity lies within an even narrower span of hindering effect, between 2,6-diethyl- and 2,6-ditert. butyl-4-nitrophenol. A preferred composition is 2,6-diisopropyl-4-nitrophenol, which lies in the center of this range.

The phytotoxic selectivity and activity cannot be explained entirely on the basis of the hindering effect, however. A group of hindered phenols which also lie within the intermediate range are essentially non-phytotoxic These include 2,6-dibutyl-4-nitrophenol; 2,6-diisobutyl-4-nitrophenol and 2,6-disec.butyl-4-nitrophenol. Another hindered phenol which is substantially non-phytotoxic is 2,6-diphenyl-4-nitrophenol. The experimental results indicate that the isopropyl group has a unique, as yet unexplained effect on both activity and selectivity, at least one isopropyl substitutent being necessary to obtain the desired properties for combating weeds in soybeans.

Post-emergent use of 2,6-diisopropyl-4-nitrophenol to combat weeds is illustrated in the following example.

EXAMPLE

Soybeans and ten species of weed seeds were planted in sandy loam in greenhouse flats and were watered at intervals so as to obtain good germination and growth. When the plants had grown to a height of one to three inches the flats were sprayed with an aqueous dispersion of 2,6-diisopropyl-4-nitrophenol at application rates varying from ½ lb./acre to 2 lb./acre. After one week of time had elapsed subsequent to spraying, the results were judged and rated on a numerical scale from 0 (no injury) to 4 (complete kill). The results are summarized in the following table.

| | Height, inches | No. of true leaves | Results at three application rates (lb./A.) | | |
|---|---|---|---|---|---|
| | | | ½ | 1 | 2 |
| Plant species: | | | | | |
| Pigweed | 1 | 2 | 4 | 4 | 4 |
| Lambsquarter | 1 | 4 | 3 | 4 | 4 |
| Velvet leaf | 2 | 2 | 0 | 0 | 1 |
| Morning glory | 1½ | 1 | 0 | 0 | 2 |
| Cocklebur | 2 | 4 | 0 | 1 | 3 |
| Giant foxtail | 1 | 3 | 0 | 2 | 2 |
| Crabgrass | ½ | 2 | 0 | 2 | 3 |
| Yellow foxtail | 1 | 2 | 0 | 2 | 2 |
| Green foxtail | 1 | 2 | 0 | 1 | 2 |
| Bromus tectorum | 2 | 2 | 0 | 0 | 1 |
| Soybean | 3 | 2 | 0 | 0 | 1 |

A portion of the flats of growing plants was also sprayed in a separate experiment with a combination of 2 lb./A. of ammonium thiocyanate and 2 lb./A. of 2,6-diisopropyl-4-nitrophenol with improved results, including a complete kill of morning glory, cocklebur, crabgrass and green foxtail, but without increasing the injury to soybeans. Use of sufficient thiocyanate in conjunction with the partially hindered phenol so as to effect control of a larger group of plant species is desirable in some instances.

The method of this invention is preferably used in soybean fields in which the beans have no more than eight true leaves and are no more than about six inches high. The active chemical is ordinarily applied to the locus of the weeds at a rate varying from ½ to about 5 lbs. per acre, application at the higher rates being limited as much as possible to the locus of weeds between the rows, so as to avoid excessive injury to the beans. In a typical operation, spray nozzles are spaced so that they apply active chemical at the rate of about one to two pounds per acre, with an overlapping of adjacent spray patterns between the rows so that the weeds in that area are sprayed at a higher rate.

The preferred method presents no substantial hazard to wildlife or to domestic animals. The $LD_{50}$ as determined on laboratory white rats is $4.6 \pm 1.1$ g. per kilogram of body weight. The low rates of application, coupled with the rapid disappearance of residues renders the method substantially non-hazardous in practice.

I claim:

1. The method of combating weeds which comprises applying to the locus of weeds growing in close proximity to soybeans a herbicidally effective amount of a partially hindered 2,6-dialkyl-4-nitrophenol in which the total hindering effect of the two alkyl groups lies between that which exists in 2,6-diethyl-4-nitrophenol and in 2,6-ditert.butyl-4-nitrophenol and at least one of the alkyl groups is isopropyl.

2. The method which comprises applying 2,6-diisopropyl-4-nitrophenol at a rate varying from about ½ to 5 lbs. per acre to the locus of weeds growing in close proximity to soybeans.

3. The method of claim 2 in which the soybeans have no more than 8 true leaves and are no more than about 6 inches high.

4. The method of claim 1 in which a quantity of ammonium thiocyanate, sufficient to effect control of a larger number of plant species is also applied to the locus of the weeds.

5. The method of claim 3 in which a quantity of ammonium thiocyanate, sufficient to effect control over a larger number of plant species, is also applied to the locus of the weeds.

References Cited

UNITED STATES PATENTS 2,935,392   5/1960   Mussell _____ 71—122

JAMES O. THOMAS, JR., Primary Examiner

U.S. Cl. X.R.

71—122